July 29, 1952  S. B. HENDRICKSON  2,605,098
SUSPENSION MEANS FOR BABY CARRIAGES AND THE LIKE
Filed Dec. 13, 1946  2 SHEETS—SHEET 1

Inventor:
Severine B. Hendrickson
By Geo. H. Kennedy Jr.
Attorney

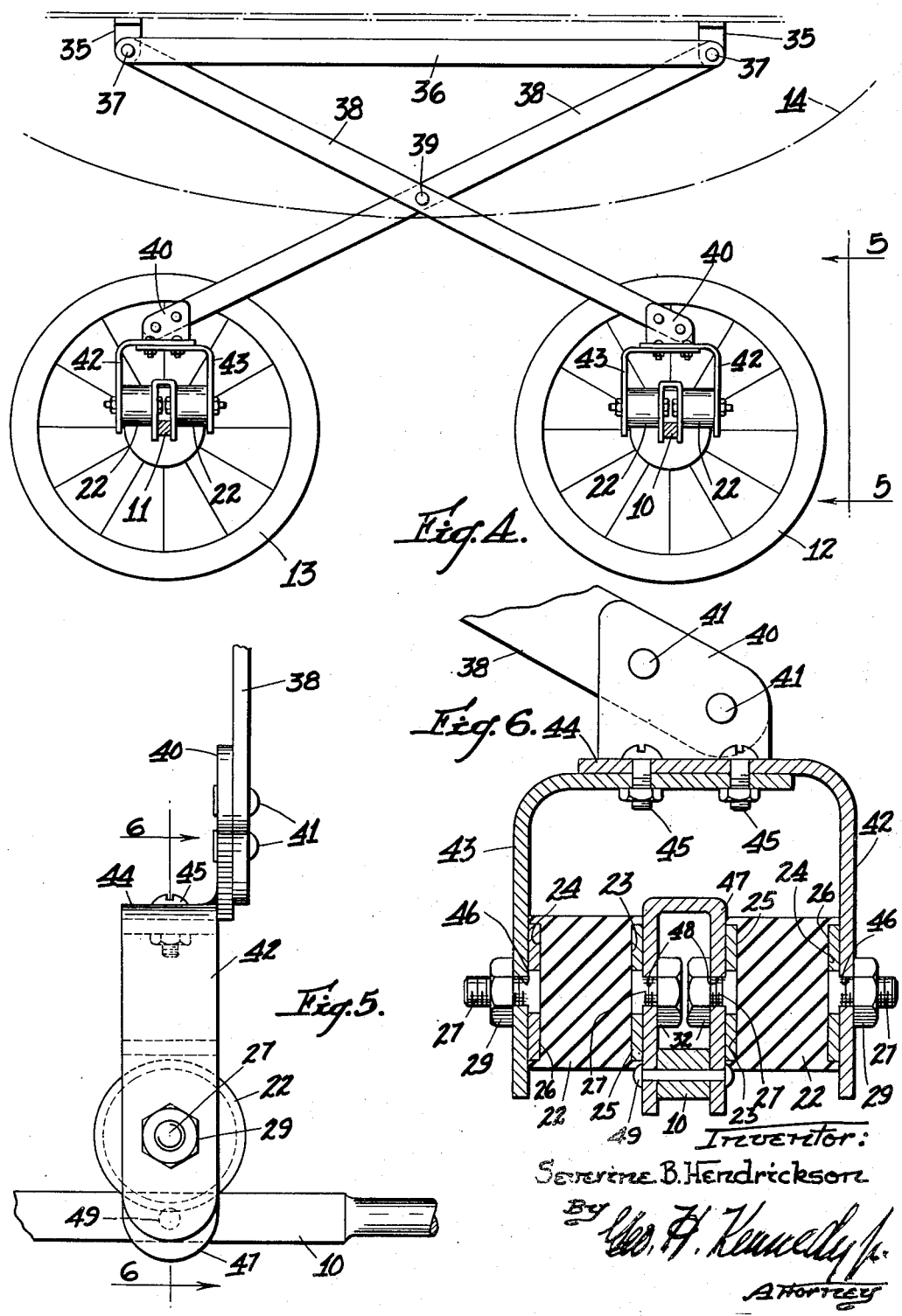

Patented July 29, 1952

2,605,098

UNITED STATES PATENT OFFICE 2,605,098

SUSPENSION MEANS FOR BABY CARRIAGES AND THE LIKE

Severine B. Hendrickson, Templeton, Mass., assignor to Heywood-Wakefield Company, Gardner, Mass., a corporation of Massachusetts Application December 13, 1946, Serial No. 716,060

3 Claims. (Cl. 267—5)

This invention relates in general to suspension means for the running gear of a baby carriage. More specifically, the present invention relates to an improved baby carriage wheel suspension means which will effect, in a more simple and inexpensive manner, a "knee-action" mounting for each of the four wheels of the carriage, and at the same time a floating and self-leveling action for both front and rear axles.

With the above and other objects in view as will hereinafter appear, the invention comprises the devices, combinations and arrangements of parts hereinafter set forth and illustrated in the accompanying drawings of a preferred embodiment of the invention from which the several features of the invention and the advantages attained thereby will be readily understood by those skilled in the art.

In the accompanying drawings:

Fig. 4 is a part sectional view showing one side of a second form of baby carriage running gear in accordance with the invention, the section being in a vertical plane transverse to the vehicle axles.

Fig. 5 represents an enlarged view taken substantially along the line 5—5 of Fig. 4.

Fig. 6 is a sectional view taken substantially along the line 6—6 of Fig. 5.

Like reference characters refer to like parts in the different figures.

Figure 1:
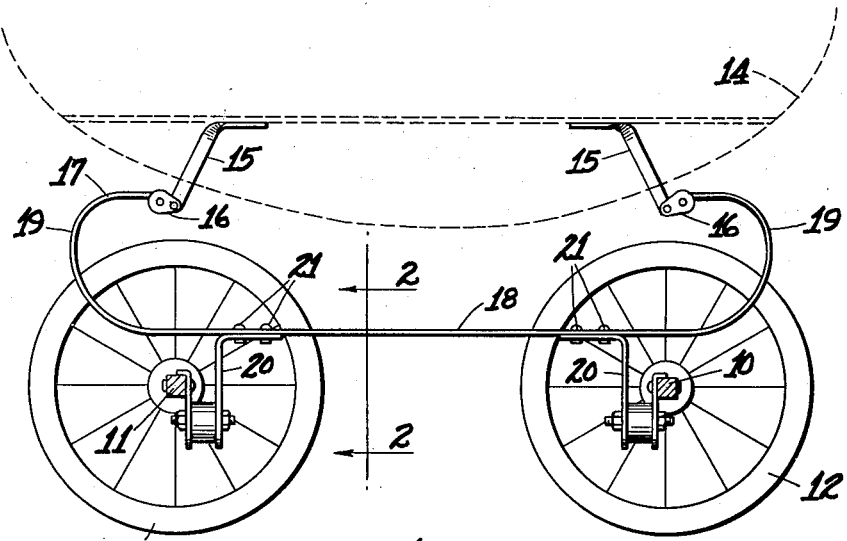
Fig. 1 is a part sectional view showing one side of a baby carriage running gear and spring suspension in accordance with the invention, the section being in a vertical plane transverse to the vehicle axles.

In Fig. 1 is shown a baby carriage running gear that includes the usual front and rear axles 10 and 11 on the ends of which are carried a pair of front wheels 12 and a pair of rear wheels 13, only one front wheel and one rear wheel being shown. The bottom of the carriage body, above the running gear, is indicated by a broken line 14. Any conventional means of support for said body may be employed, the means here shown being a pair of arms 15, 15 connecting each side of the body through the usual shackles 16, 16 to the curved ends of an elongated leaf spring 17, extending lengthwise of the carriage, two of said springs 17, in parallel relation and overhanging the axles 10 and 11 at front and rear, being of course provided.

In the past, it has been the usual practice to support the springs 17 directly on the axles 10 and 11, and at each point of support to rivet or otherwise rigidly connect the parts together, whereby the springs 17 serve, through their intermediate flat portions 18 to hold the two axles parallel to each other and in properly spaced relation. It is to be understood that in such a conventional spring suspension, the only spring action obtained is that provided by the curved end portions 19, 19 of the springs; such a spring suspension with its rivet connection of springs 17, 17 to the axles 10 and 11 is without power to cushion in any way the shocks imparted to the running gear itself, in the passage of the wheels 12 and 13 over rough ground, or to compensate in the slightest degree for bumps and depressions encountered by any individual wheel and tending to disturb the level of the axle which carries said wheel. In other words, in such a prior baby carriage suspension the individual wheels were not permitted to have their axles shift relatively to the leaf springs.

Figures 2, 3:
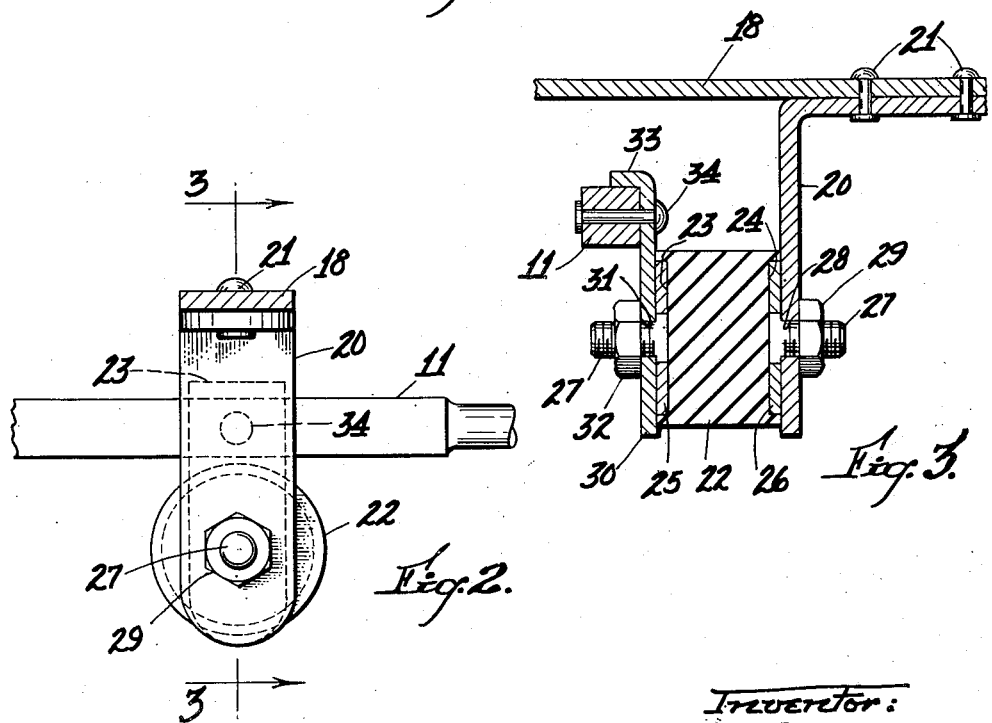
Fig. 2 represents an enlarged sectional view taken substantially along the line 2—2 of Fig. 1.
Fig. 3 is a sectional view taken substantially along the line 3—3 of Fig. 2.

The present invention contemplates the provision of means interposed between the springs 17 and the axles 10 and 11 for the purpose of permitting the axles to shift relatively to the springs thereby to effect a "knee-action" movement. According to this invention the elongated body springs 17, 17 instead of having their intermediate horizontal portions 18, 18 connected rigidly front and rear to the axles 10 and 11, are so connected to said axles at the four corners of the running gear as to give these axles a floating and self-leveling action. Referring particularly to Fig. 1, each spring near its ends (and thus at each of the four corners of the running gear) carries a depending bracket arm or body-supporting member 20 the top portion of which is secured to the spring 17 by means of rivets 21, 21 or any other suitable means. Each bracket 20, as best shown in Figs. 2 and 3 is shaped as an inverted L the longer arm of which is disposed substantially at right angles with the horizontal portion 18 of the spring 17. Carried by the lower portion of each of the arms 20, 20 is a cylindrical pliable member 22 of rubber or other suitable material. Each of the members 22 has bonded to each of its respective face portions 23 and 24 disk members 25 and 26. Projecting outwardly from the central portion of each of the disk members 25 and 26 is a threaded boss 27. Referring particularly to Fig. 3, each of the arms 20, 20 is provided with an aperture 28 which receives one of the threaded bosses 27 and in order to secure the rubber member 22 in its proper position a nut 29 is threaded upon the boss 27 in abutting relationship with the arm 20.

A second bracket member 30 having an aperture 31 therein is mounted directly upon the disk 25 and is secured thereto by means of a nut 32. Thus, the rubber member 22 is disposed between the bracket arms 20 and 30 in a manner such that these arms are disposed in parallelism with each other. The upper portion of the bracket arm 30 is provided with a lip 33 which is adapted to bear against the top portion of its associated axle member 10 or 11. A rivet 34 secures each arm 30 rigidly to its associated axle member.

From the above it is to be understood that the bracket arm 20 is rigidly secured to the spring 17 and the bracket arm 30 is rigidly secured to its associated axle 10 or 11. However, the member 22, interposed between the bracket arms 20 and 30, is of such a character that it will permit the arm 30 to move up and down relative to and in parallelism with the arm 20 and also it will permit the arm 30 substantially to pivot about the disk 26 to the end that each of the carriage wheels will substantially float relative to the springs 17, 17. From this it will be clear that the mountings 22 will effect a "knee-action" movement of each of the wheels so that any one of the wheels may ride over any bump or irregularity that appears in its path of travel without transferring the shock to the carriage proper. Not only will the mounting 22 permit its associated axle to move up and down relative to the spring 17 but it will also permit the axle to move lengthwise of itself relative to the springs 17, 17 thereby to minimize the transmission to the running gear and body of the shocks resulting from such ground inequalities.

Referring particularly to Figs. 4, 5, and 6, a second form of the present invention is therein illustrated. According to this second form of the invention a carriage 14 is provided with arms 35, 35 which are connected by means of a horizontal stringer member 36 as at points 37, 37. Also mounted upon each of the arms 35, 35 is the upper end portion or a respective one of a pair of arms 38, 38 the intermediate portions of which are secured together as at 39. The free end portion of each of the arms 38, 38 has rigidly secured thereupon an angle bracket or body-supporting member 40 by means of a pair of rivets 41, 41. Formed upon the lower portion of each bracket member 40 is a depending arm member 42. A second arm member 43 is disposed in spaced parallel relation with the arm 42 and the upper portion of the former member is bent over substantially at right angles to the remaining portion of the arm and is secured directly to the horizontal portion 44 of the bracket 40 by means of a pair of bolts 45, 45. Thus, each of the arms 42 and 43 is rigidly secured to its associated arm member 38.

As may be best seen in Figs. 5 and 6, each of the arm members 42 and 43 is provided with an aperture 46 which is adapted to receive a threaded boss 27 of a mounting unit 22 of the type which was hereinabove described. Each of the mounting units 22, 22 is rigidly secured to its arm 42 or 43 by means of a nut 29. Disposed between the two mounting units 22, 22 is an inverted U-shaped channel member 47 the opposite sides of which are provided with apertures 48, 48 for the purpose of receiving the threaded boss members 27, 27 of the axially aligned mounting members 22, 22. Nuts 32, 32 secure the threaded bosses 27, 27 to the channel member 47. The lower portions of each of the channel members 47, 47 are adapted to receive one of the axles 10 or 11 therein and the axle is rigidly secured to the channel member by means of a rivet 49. Thus, from the above it is to be understood that the bracket arm members 42 and 43 are rigidly secured to their associated arm member 38 and that the channel member 47 is rigidly secured to its associated axle member. It is to be noted that the leaf springs 17, 17 of the first described carriage have been completely eliminated in this second form of the invention. These leaf springs 17, 17 have been so eliminated for the reason that in this second form of the invention they are not required as the dual mountings 22, 22 which are provided at each of the four corners of the running gear will function to impart to the running gear an equivalent action which was effected in the first carriage by means of the springs 17, 17. Referring particularly to Fig. 6, it is to be understood that the axle 10 may readily move up and down relative to the carriage proper and in parallel relation with each of the arms 42 and 43 thus simulating the action imparted to the first described carriage by means of the leaf springs 17, 17. Also, it is clear that the axle 10 may at the same time substantially pivot about the disks 26, 26 of the mounting members 22, 22. Thus, by use of this second form of the invention each of the carriage axles may move at its ends in an independent manner relative to the remainder of the carriage running gear to the end that a true "knee-action" movement is effected.

It is to be understood that in both forms of the present invention each of the rubber connecting members 22, 22 is disposed with its longitudinal axis contained in a plane parallel with the axes of the axles 10 and 11. Thus, each member 22 is adapted to be shear-loaded whenever the axles move toward and away from the carriage. In this connection it is to be understood that mounting units such as members 22, 22 function most efficiently as flexible connection means when loaded in shear for the reason that they afford the greatest amplitude of movement when so loaded. Loading such a mounting member in compression or in tension cannot produce the same high amplitude of movement as is produced under shear loading. In both forms of the present invention each of the connecting members 22, 22 is located with its longitudinal axis disposed in parallel relation with the longitudinal axis of the carriage. Although this particular mounting alignment is not absolutely necessary it has been found that the most beneficial results are obtained therefrom.

I claim:

1. A running gear for children's vehicles, comprising in combination, a plurality of body-supporting members secured to the underside of said vehicle, a pair of wheel-carrying axles extending crosswise of and beneath the vehicle, a pair of concentrically spaced inner and outer inverted U-shaped members associated with each end portion of each of said axles, the lower arm portions of each of said inner members being secured to and disposed in straddling relation with its associated axle, means to secure the upper portion of each of said outer members with one of said body-supporting members, a pair of cylindrical rubber blocks associated with each pair of said inner and outer members, each of said blocks being disposed between a respective pair of the adjacently spaced arms of its associated inner and outer members so that the blocks will be coaxially aligned with each other and will have their common axis disposed in a horizontal plane and crosswise of said axles, and a plate bonded to each end portion of each of said blocks for rigidly securing such end portions to their associated inner or outer members.

2. A running gear for children's vehicles, comprising in combination, a plurality of body-supporting members secured to underside of the vehicle body, axles extending crosswise beneath the vehicle body for mounting the vehicle wheels, a pair of spaced brackets, adjacent each end of each of said axles, providing legs extending vertically in parallel relation, with one bracket of said pair engaging one end of an axle, and secured thereto, and with the other bracket of said pair attached to a body-supporting member, a rubber block disposed between the parallel legs of said brackets, and plates bonded to the ends of said block and providing aligned studs attached to said bracket legs.

3. A running gear for children's vehicles, comprising in combination, a plurality of body-supporting members secured to underside of the vehicle body, axles extending crosswise beneath the vehicle body for mounting the vehicle wheels, a pair of spaced brackets, adjacent each end of each of said axles, providing legs extending vertically in parallel relation, with one bracket of said pair engaging one end of an axle, and secured thereto, and with the other bracket of said pair attached to a body-supporting member, a cylindrical rubber block disposed between the parallel legs of said brackets, plates bonded to the ends of said block and aligned studs mounted on said plates and attached to said bracket legs, with the axis of said studs extending centrally of said block, and lying in a horizontal plane offset from said axle.

SEVERINE B. HENDRICKSON.

REFERENCES CITED

The following references are of record in the file of this patent:

UNITED STATES PATENTS

| Number | Name | Date |
|---|---|---|
| 1,823,115 | Morriss | Sept. 15, 1931 |
| 2,063,758 | Schjolin | Dec. 8, 1936 |
| 2,233,540 | Latshaw | Mar. 4, 1941 |
| 2,272,270 | Krotz | Feb. 10, 1942 |
| 2,361,529 | Briggs | Oct. 31, 1944 |

FOREIGN PATENTS

| Number | Country | Date |
|---|---|---|
| 53,159 | Denmark | May 31, 1937 |
| 215,418 | Great Britain | May 15, 1924 |
| 294,040 | Great Britain | July 19, 1928 |
| 532,149 | Great Britain | Jan. 17, 1941 |
| 540,589 | France | Apr. 22, 1922 |